R. B. JACKSON.
TRANSMISSION GEARING.
APPLICATION FILED MAY 7, 1909.

1,027,608.

Patented May 28, 1912.

2 SHEETS—SHEET 1.

Witnesses

Inventor
Roscoe B. Jackson
By
Attys

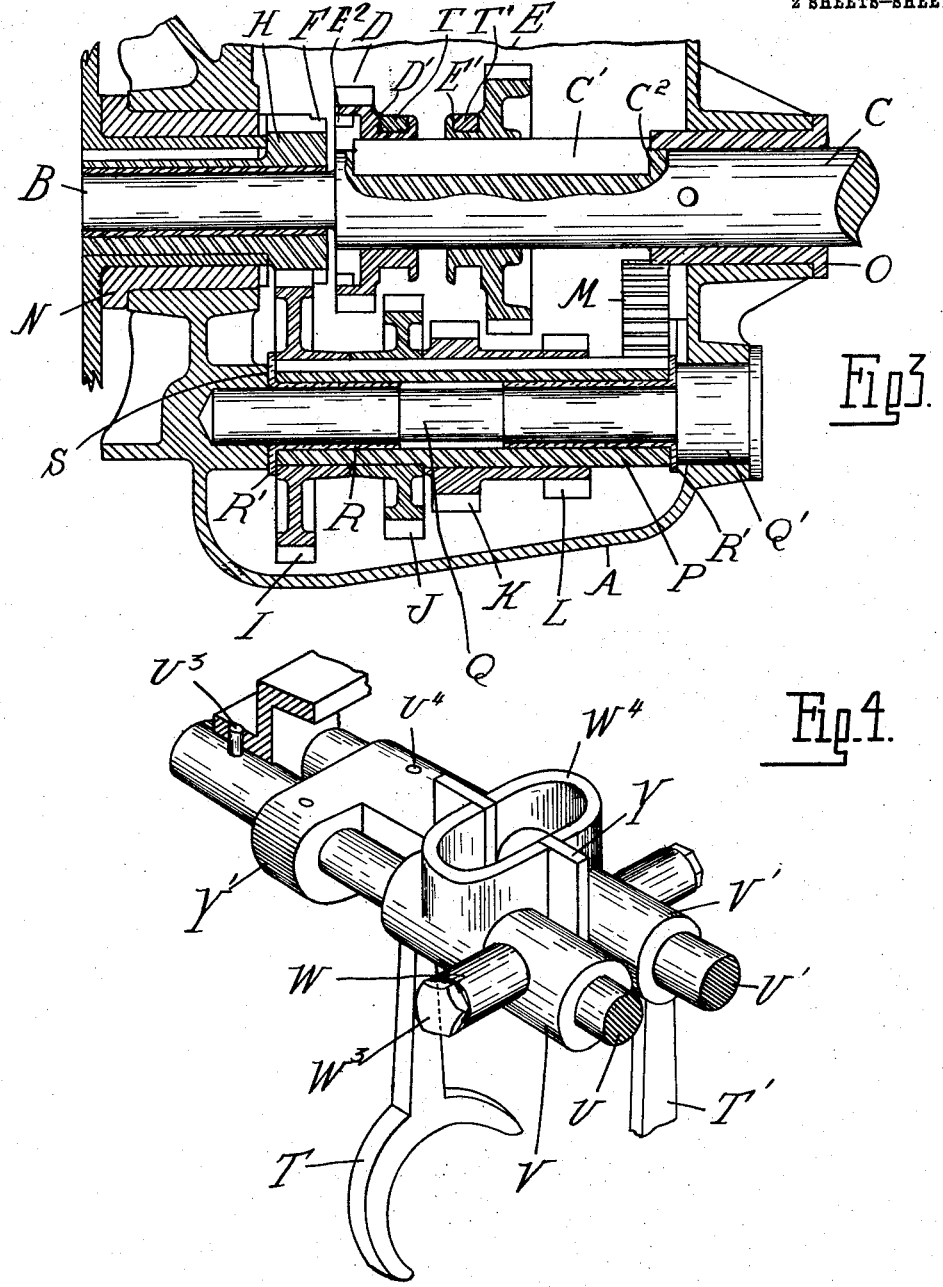

UNITED STATES PATENT OFFICE.

ROSCOE B. JACKSON, OF DETROIT, MICHIGAN, ASSIGNOR TO HUDSON MOTOR CAR COMPANY, OF DETROIT, MICHIGAN, A CORPORATION OF MICHIGAN.

TRANSMISSION-GEARING.

1,027,608.

Specification of Letters Patent.   Patented May 28, 1912.

Application filed May 7, 1909.   Serial No. 494,672.

*To all whom it may concern:*

Be it known that I, ROSCOE B. JACKSON, a citizen of the United States of America, residing at Detroit, in the county of Wayne and State of Michigan, have invented certain new and useful Improvements in Transmission-Gearing, of which the following is a specification, reference being had therein to the accompanying drawings.
The invention relates to transmission gearings of the slide-gear type, and it is the particular object of the invention to simplify and cheapen the cost of construction, and at the same time to obtain an efficient, durable and easily operable device.

To this end the invention consists—first— in the construction of the housing; second, in the means for mounting the operating parts of the mechanism therein; third, in the construction and arrangement of the control mechanism; and fourth, in the peculiar construction, arrangement and combination of parts as hereinafter set forth.

Figure 1:
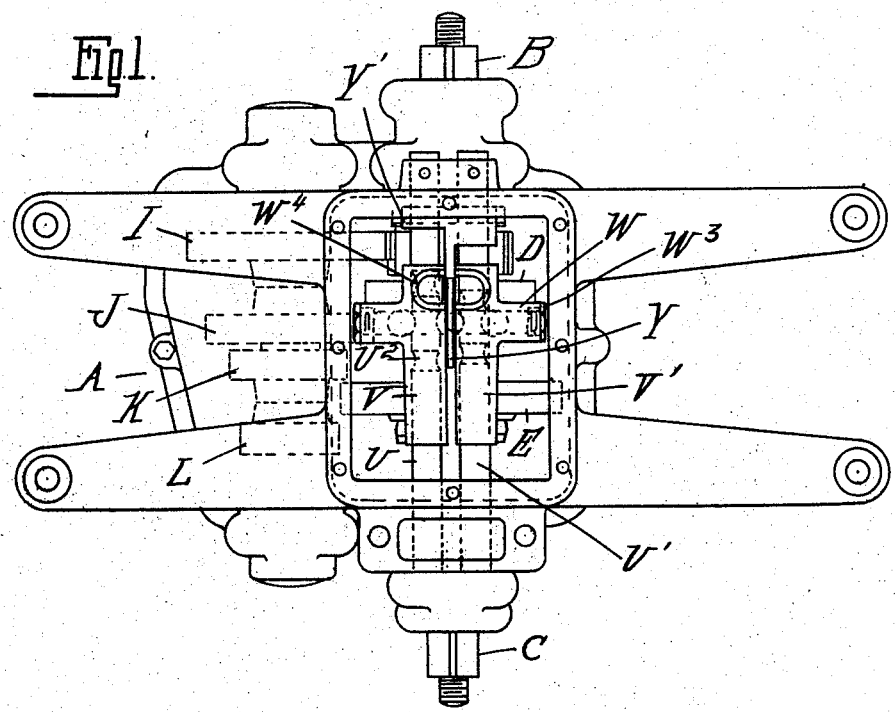
Figure 2:
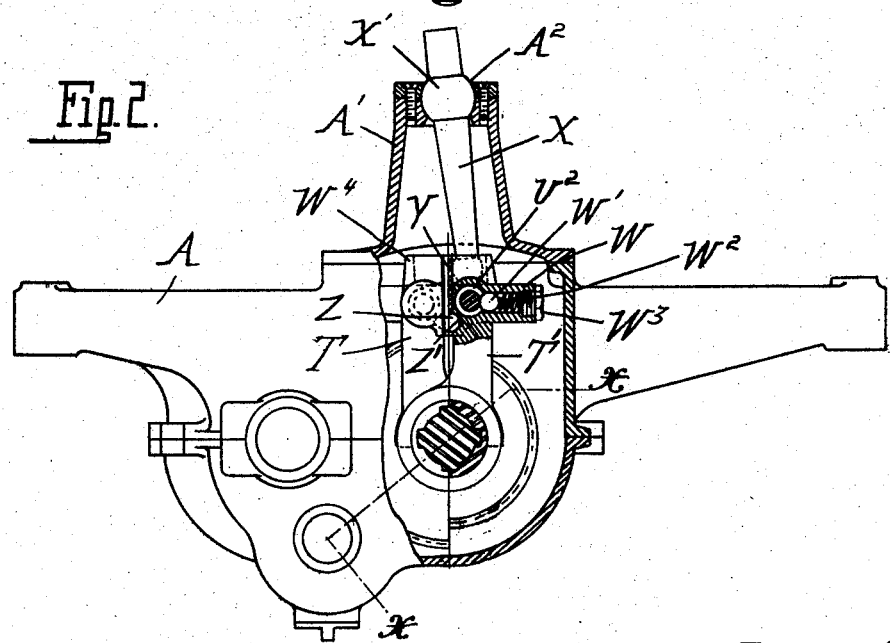

In the drawings—Figure 1 is a plan view;
Fig. 2 is a sectional end elevation; Fig. 3 is a longitudinal section substantially on line $x$—$x$ of Fig. 2; and Fig. 4 is a perspective view of the gear shifting mechanism.

A is the housing, which is of the type commonly known as "one-piece"—that is, all of the space in which the gearing is located is inclosed by a single integral casting.

B and C are respectively the drive and driven shafts, which are arranged in axial alinement and extend through bearings upon opposite ends of the case.

D and E are slidable gears feathered upon the driven shaft C, the gear D being provided with a clutch member $E^2$ for engagement with a complementary clutch member F upon the drive shaft.

H is a drive gearing preferably integral with the clutch member F, and I, J and K are gears upon a countershaft parallel to the driven shaft and adapted for engagement respectively with the gears H, D and E.

L is a fourth countershaft gear which is arranged to coöperate with the gear E and a reverse pinion M for effecting the reverse drive of the shaft C.

To reduce the cost of manufacture, it is desirable to avoid machining of the housing A as far as possible, and particularly machining on the inside of the case. To this end, the bearings for the shafts B and C are formed by bushings N and O, which are inserted in alined bores in opposite ends of the case. The gears H, D and E are engaged by an endwise movement with their respective shafts, and the inner ends of the bushings form end bearings for the gears, which avoids the machining of the inner wall of the case. The gears I, J, K and L are mounted upon a sleeve or tubular shaft P, which is of a length slightly less than the distance between the inner faces of the end walls, and which may be inserted laterally through the opening in the top of the case.
This shaft is positioned by a stationary shaft or pin Q, which is inserted through a bore in one of the end walls of the case, and at its inner end engages an alined socket in the opposite wall. The outer end of this pin or shaft is enlarged to form a head Q', which fits the bore in the outer wall of the case, and which projects inward a slight distance to form an end bearing for the shaft P. An inner bearing for the opposite end of the shaft P is formed by a hub or inward projection S on the case, and the end of this bearing may be conveniently faced off by the same tool employed for boring the socket which receives the inner end of the pin Q, the facing tool being permitted entrance into the case through the large bore in the opposite end wall. Thus opposite end bearings are provided for the shaft P without any machining other than that which can be performed simultaneously with the boring operation. Bushings R are provided sleeved upon the pin Q to form journal bearings for the opposite ends of the shaft P, and these bushings are provided with flanges R' which form end thrust bearings against the head Q' and hub S.

For shifting the gears D and E, each is preferably provided with a grooved collar D' E', which are engaged by shifter arms T and T'. These arms are slidably mounted upon guides U U', which are detachably mounted in the case, the construction being as follows: The rods U U' are arranged parallel to each other and engage alined bores in the opposite end walls of the case above the gearing. V V' are sleeves forming the sliding bearings for the arms T T' upon the rods U U' and preferably formed integral with said arms. Each sleeve is preferably provided with a laterally-projecting lug W, which is apertured to receive a latch W', preferably a ball, and a spring W², which is retained by a cap W³. The balls W' are adapted to engage a series of notches U² in each of the rods U U', and which hold the gears in various positions of adjustment.

The slides are operated by an arm or lever X which is adjustable both laterally and longitudinally, and is engageable alternatively with recesses in the slidable sleeves V V'. These recesses are formed by upwardly-projecting lugs W⁴ on the sleeves recessed upon their inner faces and when arranged in registration form a lateral passage for the arm X from engagement with one of the sleeves into engagement with the other. A guard plate Y is arranged between the lugs W⁴ which is provided with a notch or cut-out portion, which is in alinement with the recesses in said lugs when the latter are in registration, but in every other position of adjustment of either of the slides V V' the plate Y will prevent lateral movement of the arm X. This guard plate Y is preferably formed integral with a head Y' sleeved upon both of the rods U U', and this head also forms a stop for limiting the movement of the sleeves V V'. A lock for preventing the simultaneous movement of the slides V V' is formed by a ball Z which engages a notch in the plate Y and a registerng notch Z' in one or the other of the slides V V'. The notches Z' are arranged opposite each other in the neutral position of the slidable sleeves V V'—that is, where the recesses in the lugs W⁴ are in registration. This permits the ball Z to be moved through the notch in the plate Y into the opposite notch Z' whenever one of the slides is adjusted from its neutral position, but after such adjustment the ball is held from movement and consequently locks the opposite slide to the plate Y so as to prevent movement thereof.

The rods U U' are preferably locked in position by being pinned to their bearings in the case A, as shown in U³, and the plate Y and head Y' are secured by pinning the latter to each of the rods U U', as shown at U⁴. This arrangement permits of quickly and accurately assembling the parts in proper relation to each other, as each of the rods U U' may be adjusted separately into proper relation to the head Y' and pinned thereto, after which both rods may be adjusted in their bearings in the case, and when in proper position may be pinned, or, if preferable, the parts may be assembled in reverse order, the rods U U' being first secured in relation to the case and the head Y' then secured in position upon the rods.

The operating arm or lever X—as already described—is movable both longitudinally and laterally of the casing, the former movement being for adjustment of the slides and the latter for change of engagement from one slide to the other. I preferably provide for this movement of the arm by universally pivoting it in a bearing on the case. Thus, as shown, the case A is provided with a cover having an upward extension A' and at the upper end of this extension is a spherical socket A² for engagement with a spherical bearing X' on the lever X. Thus the lever is free to be moved in any direction which permits of both the lateral movement or change of engagement with the slides and longitudinal movement or adjustment of the slides.

The gear wheels D and E are feathered upon the shaft C and to this end a feather or key C' is engaged with a key seat in the shaft. To secure this key in position, its opposite ends are notched at C², and the shaft is riveted over or pinned into this notch so as to prevent disengagement of the key.

What I claim as my invention is:

1. In a transmission gearing, the combination with a case having alined bores in opposite walls thereof, of a guide rod insertible through one of said bores into engagement with the other, a shifter slidably engaging said rod, a detent on said shifter for engaging a series of recesses in said rod, a member of the transmission gearing with which said shifter is engaged having a plurality of positions for operation, and means for securing said rod in a position of adjustment in said alined bores where the points of engagement of said detent and recesses correspond with said positions of adjustment of said shiftable member.

2. In a transmission gearing, the combination with a pair of independently movable shifters, of parallelly-arranged guide rods with which said shifters are respectively slidably engaged, a case having alined bearings with which said rods are engaged by a longitudinal movement, a yoke extending between and engaging said rods forming stops for the respective shifters, a detent for each shifter engageable with recesses in its corresponding guide rod, and means for fixedly securing said yoke to said rods, and independent means for fixedly securing said rods in said bearings.

3. In a transmission gearing, the combination with a case, a guide rod engaging alined bores in the opposite walls of said case, a shifter sleeved upon said rod intermediate said walls, a detent on said shifter engageable with a series of recesses in said rod, a stop for said shifter sleeved on said rod, means for fixedly securing said stop on said rod in proper relation to the points of engagement of said detent and recesses, and means for fixedly securing said rod in its bearings in said case.

4. In a transmission gearing, the combination with a case, of a pair of parallelly-arranged guide rods engaging alined bearings in said case, independently movable shifters slidably engaging their respective rods, an actuating member for alternatively operating said shifters, and movable laterally from engagement with one into engagement with the other, and a yoke sleeved upon said rods having a guard plate projecting between said shifters.

5. In a transmission gearing, the combination with a case, of a pair of parallelly-arranged guide rods engaging alined bearings in said case, independently movable shifters slidably engaging their respective rods, an actuating member for alternatively engaging said shifters, a guard plate between said shifters for preventing change of engagement of said actuating member in all but one position of adjustment of said shifters, and means for locking either one of said shifters to said guard plate upon the adjustment of the opposite shifter from its neutral position.

6. In a transmission gearing, the combination with a case inclosing the gearing and having a pair of alined bores in opposite walls thereof adjacent the top, a pair of guide rods each insertible longitudinally through one of said bores across the case above the gearing into engagement with the complementary bore in the opposite wall of the case, and means for locking said rods within said bores in a predetermined position of adjustment.

7. In a transmission gearing, the combination with a case inclosing the gearing and having alining bores in opposite walls thereof above the gearing, a guide rod insertible longitudinally through one of said bores across the case into engagement with the other bore, a slide upon said rod, a stop upon the rod for the slide, an operating arm for said slide, and means for fixedly securing the stop to the rod in proper relation to the slide.

8. In a transmission gearing, the combination with a case, of a pair of parallelly arranged guide rods, said case having alining bearings therein with which said rods engage, independently movable shifters slidably engaging their respective rods, an actuating member for alternatively engaging said shifters, means within the case for preventing change of engagement of said actuating member in all but one position of adjustment of the shifters and for locking either one of said shifters upon the adjustment of the other from its neutral position.

9. In a transmission gearing, the combination with a case having alined bearings therein, of a pair of parallelly arranged guide rods engaging said bearings, independently movable shifters slidably engaging their respective rods and having slotted bearings, a lever for alternatively engaging the bearings, the latter being registerable to permit change of engagement of the lever, and means interposed between said slotted bearings for locking one shifter upon the adjustment of the other from its neutral position.

10. In a gearing, shifting forks having portions arranged side by side when in neutral position, means for shifting the forks, means for supporting and guiding the forks in their shifting movement, and means independent of said supporting and guiding means for the forks and operative by the moved fork for locking the unshifted fork from movement, said means comprising a support extending between portions of the forks and having a transverse passage opening through opposite sides thereof, and a bolt slidable in the passage and coacting at its opposite ends respectively with the forks, the bolt and the forks being provided with coacting surfaces whereby the bolt is moved lengthwise in the passage into engagement with the unshifted fork when the other fork is being shifted.

11. In a selective gearing, a case, shifting forks within the case arranged side by side when in neutral position, and means for selecting and shifting any one of the forks including an element for coacting with the forks, a member for guiding such element in its selecting movement, the guide member extending between the portions of the forks with which said element coacts and being fixed to the case, and said element being shiftable transversely of the guide member into engagement with either of the forks when the forks are in neutral position for selecting one of the forks, the portion of said element coacting with the guide member and the forks being of greater width than the contiguous portion of the guide member in order to engage with the forks when engaged with the guide member and being movable into engagement with but one fork when moved out of engagement with the guide member.

In testimony whereof I affix my signature in presence of two witnesses.

ROSCOE B. JACKSON.

Witnesses:
G. W. DUNHAM,
MARY S. HUNTER.